United States Patent [19]

Korzonas

[11] Patent Number: 4,517,806
[45] Date of Patent: May 21, 1985

[54] APPARATUS FOR SEPARATING ICE FROM A SLURRY AND WASHING THE ICE

[75] Inventor: Raymond Korzonas, Chicago, Ill.

[73] Assignee: Chicago Bridge & Iron Company, Oak Brook, Ill.

[21] Appl. No.: 598,494

[22] Filed: Apr. 9, 1984

[51] Int. Cl.³ .............................................. B01D 9/04
[52] U.S. Cl. ........................................ 62/123; 62/540
[58] Field of Search .................. 62/123, 541, 540, 188

[56] References Cited

U.S. PATENT DOCUMENTS

| | | | |
|---|---|---|---|
| 3,267,686 | 8/1966 | Holley | 62/123 |
| 4,341,085 | 7/1982 | Nail | 62/124 |

Primary Examiner—William E. Wayner
Assistant Examiner—John M. Sollecito
Attorney, Agent, or Firm—Marshall, O'Toole, Gerstein, Murray & Bicknell

[57] ABSTRACT

Apparatus for separating ice from concentrated liquid and washing the ice, including a vessel having a bottom and vertical wall joined to the bottom; a plurality of vertical tubular members in the vessel extending upwardly from the bottom; perforations in the upper portion of the tubular members through which concentrated liquid in the vessel can drain into the tubes; a first conduit for feeding a slurry of ice and concentrated liquid to the vessel; a second conduit communicating with the tubes for withdrawing concentrated liquid from the tubes; a concentrated liquid withdrawal third conduit communicating with the vessel lower interior portion for withdrawing concentrated liquid from the vessel; and control means to maintain a predetermined concentrated liquid level, and a predetermined pressure distribution, in the vessel.

6 Claims, 1 Drawing Figure

U.S. Patent    May 21, 1985    4,517,806
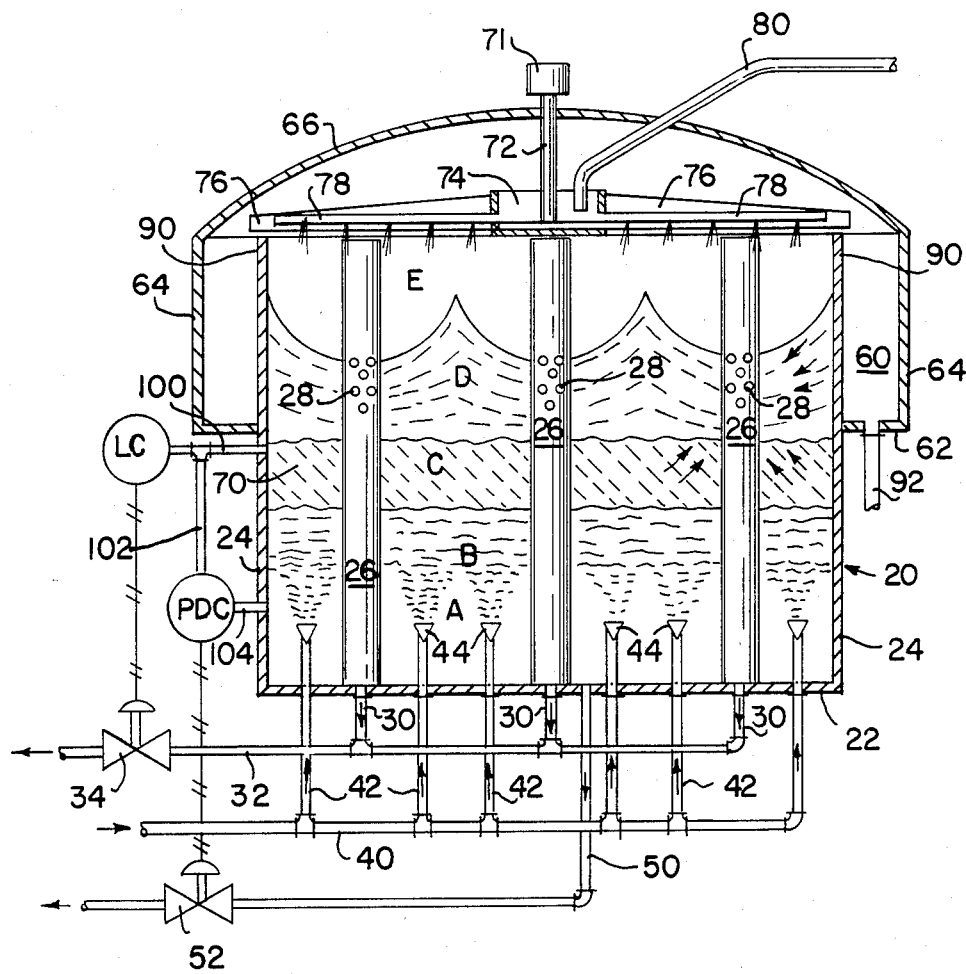

APPARATUS FOR SEPARATING ICE FROM A SLURRY AND WASHING THE ICE

This invention relates to apparatus for separating and washing ice formed in producing potable water from brackish water and seawater, and in concentrating aqueous products by removing water as ice.

BACKGROUND OF THE INVENTION

Various freeze processes and apparatus have been developed to produce potable water from seawater or brackish water; to concentrate fruit juices such as orange juice, grape juice and apple juice, vegetable juices such as tomato juice, and coffee; and to separate dissolved or suspended solids from a liquid carrier. See, for example, Engdahl et al U.S. Pat. Nos. 4,286,436; Ashley 3,501,924; Ganiaris 3,620,034; Johnson 3,664,145 and Ogman 4,091,635.

After an ice slurry has been produced, it is usually desirable to separate the ice from the liquid and to wash it with pure water. When potable water is being produced from seawater or brackish water, the washing is necessary to remove salt water solution residues from the ice surfaces. In the concentration of various products, such as a fruit juice, the ice is washed to recover any juice residue clinging to the ice crystals.

Apparatus for separating an ice slurry and washing the ice for the described purposes has been known in the art for a considerable amount of time. One type of such apparatus includes a vessel having a bottom and cylindrical wall with an open top. Vertical tubes with perforations in their upper portions are positioned in the vessel. An ice slurry fed to the vessel separates into a pack of ice floating on concentrated liquid. The concentrated liquid flows through the tube perforations and is collected if the liquid is a desirable product, such as a juice, drained off to waste or recycled in the process. Pure water is sprayed onto the top of the ice pack to wash it clean. As the washed ice pack rises above the vessel top edge it is scraped off and collected. Melting the washed ice yields potable water. If potable water is not the desired product, such as in a juice concentration process, the ice can be melted for recovery of refrigeration or it can be discarded. An apparatus of the described type and its operation are disclosed in U.S. Pat. No. 4,341,085.

When a slurry is fed to the ice separating and washing vessel, a pressure force is created in the vessel which drives the crystal pack upwardly due to upward flow of the concentrated liquid through the forming ice crystal pack and into the perforated drain holes in the tubes. As the total liquid flow or ice crystal fraction changes, the concentrated liquid flow is affected. At times this creates a condition where the driving force increases while crystal pack formation is slowed. As a result, the crystal pack formation zone moves, causing variations in crystal pack density, porosity and draining characteristics.

When there is an increase in concentrated liquid flow, the pressure force increases with greater packing of the ice thus limiting flow of concentrated liquid through the ice thereby causing a further increase in pressure. Ultimately, an uncontrollable situation develops which leads to a breakthrough of concentrated liquid through the top of the crystal pack or a crystal breakthrough in the drains.

From the above discussion it is clear that improvements in ice separating and washing apparatus and methods are needed which permit controlled operation of ice washing.

SUMMARY OF THE INVENTION

According to the invention, apparatus for separating ice from concentrated liquid and washing the ice is provided comprising a vessel having a bottom and vertical wall joined to the bottom; a plurality of vertical tubular members positioned in the vessel and extending upwardly from the bottom, with said tubular members having perforations in the upper portion thereof through which concentrated liquid in the vessel can drain into the tubes; a first conduit for feeding a slurry of ice and concentrated liquid to the vessel; a second conduit communicating with the tubes for withdrawing concentrated liquid from the tubes; a concentrated liquid withdrawal third conduit communicating with the vessel lower interior portion for withdrawing concentrated liquid from the vessel; and control means to maintain a predetermined concentrated liquid level, and a predetermined pressure distribution, in the vessel.

The control means can be operatively responsive to a pressure distribution developed in the vessel by flow of a slurry of ice and concentrated liquid thereto and the weight of ice floating on concentrated liquid in the vessel, to control concentrated liquid flow through the third conduit to maintain a predetermined pressure distribution in the vessel.

As part of the control means, a flow control valve can be included in the liquid withdrawal third conduit to control concentrated liquid flow through the conduit to maintain the predetermined pressure distribution in the vessel.

A flow control valve can be included in the second conduit and the control means arranged to be operatively responsive to a change in concentrated liquid level in the vessel to control concentrated liquid flow through the second conduit control valve to maintain a predetermined concentrated liquid level in the vessel.

In a more specific embodiment the control means can be operatively responsive to a differential pressure between a concentrated liquid level predetermined to be located in ice floating on concentrated liquid in the vessel and a lower position located in concentrated liquid in the vessel. For this purpose, a flow control valve can be located in the second conduit; and the control means can be operatively responsive to a change in concentrated liquid level in the vessel to control concentrated liquid flow through the second conduit control valve to maintain the predetermined concentrated liquid level in the vessel.

BRIEF DESCRIPTION OF THE DRAWING

The drawing is an elevational view, partially in section, of ice separating and washing apparatus according to the invention.

DETAILED DESCRIPTION OF THE DRAWING

The ice separating and washing vessel 20 has a flat circular metal bottom 22 and a vertical circular cylindrical metal wall 24. A plurality of vertical concentrated liquid drain tubes 26 containing perforations or holes 28 are located in vessel 20. The perforations 28 are located in the upper portions of tubes 26.

The upper ends of tubes 26 are closed and the lower ends are joined to vessel bottom 22. Conduits 30 communicate with the interior of tubes 26 and with conduit 32. Concentrated liquid which drains into tubes 26 is withdrawn by conduits 30 and 32 and fed through flow control valve 34.

To feed a slurry of ice crystals and concentrated liquid to vessel 20, the apparatus is provided with a feed inlet conduit 40 having branch conduits 42 which terminate in feed inlet nozzles 44 in the lower interior space of the vessel.

A concentrated liquid outlet drain conduit 50 communicates with the lower interior space of vessel 20 and flow control valve 52 and is used to regulate or control the pressure force in the vessel. When the total flow or crystal fraction changes, the flow out bottom drain conduit 50 changes correspondingly, allowing the system to operate at the previous steady state while slowly adjusting to a new steady state without changing the crystal pack density, porosity or draining characteristics. In this manner, the relationship of pressure force to buoyant force can be adjusted and controlled.

Annular space 60, defined by a flat ring bottom 62 and vertical circular cylindrical shell 64, surrounds the upper part of vessel 20. Domed roof 66 is supported by the top of shell 64 and serves to cover both vessel 20 and annular space 60 while providing access between the two over the top edge of wall 24.

Motor 71, mounted on roof 66, drives vertical shaft 72 on the lower end of which is mounted tank 74. Scraper blades 76 project radially and horizontally outwardly from tank 74 to which they are joined. Potable wash water flows from tank 74 through radial and horizontal water distribution pipes 78. Pipes 78 can be supported by scraper blades 76. Potable water conduit 80 communicates with tank 74 for supplying water to the tank. The water flows by gravity from tank 74, through pipes 78 and out suitable spray holes or nozzles positioned along the length of the pipes. The potable water sprays onto the bed of ice crystals in the upper part of vessel 20. The washed crystals are caused to spill over the top edge 90 of wall 24 into the space 60 by rotation of scraper blades 76. The ice in space 60 is desirably melted in situ and the water then removed by means of conduit 92. However, the ice can be removed from space 60 and used as such or melted elsewhere.

When in operation the vessel 20 contains different composition zones which, with reference to the drawing, are approximately as follows, starting at the bottom zone and moving up: (A) a concentrated liquid zone, (B) an ice pack formation zone, (C) a buoyant ice crystal pack zone, (D) an ice pack gravity draining concentrated liquid zone and (E) a washed ice pack zone.

The perforated drain tubes 26 must remove any concentrated liquid and wash water which drains by gravity from the floating crystal pack (D) and remove a sufficient quantity of upwardly draining concentrated liquid from the buoyant crystal pack (C) to create a high enough pressure to overcome the weight of the floating crystal pack (C and D). This pressure, however, must be kept from increasing beyond a predetermined level because increased pressure will cause the brine to break through the top of the ice. To prevent the pressure from increasing above a predetermined level, the apparatus is provided with a control system.

The control system shown in the drawing monitors the pressure at the intended concentrated liquid level 70 by conduit 100 and the differential pressure between the concentrated liquid level 70 and the concentrated liquid zone "A" by conduits 100, 102 and 104. The pressure sensing level controller (LC) at the intended concentrated liquid level controls the position of control valve 34. A low pressure signal at the intended concentrated liquid level indicates that too much concentrated liquid is being drained through valve 34, and causes the valve to partially close, restricting the drain rate. A high pressure signal indicates that the concentrated liquid level is increasing. The corresponding signal to the control valve 34 opens the valve further to allow a higher drain rate.

The pressure differential controller (PDC) controls the drainage rate from the bottom of the wash column through conduit 50 in order to maintain an optimum differential pressure between the concentrated liquid zone "A" and the concentrated liquid level 70. If the differential pressure increases, the controller (PDC) causes valve 52 to open further, allowing more flow out of the vessel and reducing the pressure. If the differential pressure were to decrease, valve 52 would move to a more closed position, restricting flow out of the vessel and causing the differential pressure to increase.

The foregoing detailed description has been given for clearness of understanding only, and no unnecessary limitations should be understood therefrom, as modifications will be obvious to those skilled in the art.

What is claimed is:

1. Apparatus for separating ice from concentrated liquid and washing the ice, comprising:
   a vessel having a bottom and vertical wall joined to the bottom;
   a plurality of vertical tubular members positioned in the vessel and extending upwardly from the bottom, with said tubular members having perforations in the upper portion thereof through which concentrated liquid in the vessel can drain into the tubes;
   a first conduit for feeding a slurry of ice and concentrated liquid to the vessel;
   a second conduit communicating with the tubes for withdrawing concentrated liquid from the tubes;
   a concentrated liquid withdrawal third conduit communicating with the vessel lower interior portion for withdrawing concentrated liquid from the vessel; and
   control means to maintain a predetermined concentrated liquid level, and a predetermined pressure distribution, in the vessel.

2. Apparatus for separating ice from concentrated liquid and washing the ice, comprising:
   a vessel having a bottom and vertical wall joined to the bottom;
   a plurality of vertical tubular members positioned in the vessel and extending upwardly from the bottom, with said tubular members having perforations in the upper portion thereof through which concentrated liquid in the vessel can drain into the tubes;
   a first conduit for feeding a slurry of ice and concentrated liquid to the vessel;
   a second conduit communicating with the tubes for withdrawing concentrated liquid from the tubes;
   a concentrated liquid withdrawal third conduit, containing a flow control valve, communicating with the vessel lower interior portion for withdrawing concentrated liquid from the vessel; and
   control means operatively responsive to a pressure distribution, developed in the vessel by flow of a slurry of ice and concentrated liquid thereto and the weight of ice floating on concentrated liquid in the vessel, to control concentrated liquid flow through the third conduit control valve to maintain a predetermined pressure distribution in the vessel.

3. Apparatus according to claim 2 including:

a flow control valve in the second conduit; and control means operatively responsive to a change in concentrated liquid level in the vessel to control concentrated liquid flow through the second conduit control valve to maintain a predetermined concentrated liquid level in the vessel.

4. Apparatus according to claim 2 in which the control means is operatively responsive to a differential pressure between a concentrated liquid level predetermined to be located in ice floating on concentrated liquid in the vessel and a lower position located in concentrated liquid in the vessel.

5. Apparatus according to claim 4 including:

a flow control valve in the second conduit; and control means operatively responsive to a change in concentrated liquid level in the vessel to control concentrated liquid flow through the second conduit control valve to maintain a predetermined concentrated liquid level in the vessel.

6. Apparatus for separating ice from concentrated liquid and washing the ice, comprising:

a vessel having a bottom and vertical wall joined to the bottom;

a plurality of vertical tubular members positioned in the vessel and extending upwardly from the bottom, with said tubular members having perforations in the upper portion thereof through which concentrated liquid in the vessel can drain into the tubes;

a first conduit for feeding a slurry of ice and concentrated liquid to the vessel;

a second conduit communicating with the tubes for withdrawing concentrated liquid from the tubes;

a concentrated liquid withdrawal third conduit communicating with the vessel lower interior portion for withdrawing concentrated liquid from the vessel;

control means to maintain a predetermined concentrated liquid level and a predetermined pressure distribution in the vessel; and the control means being operatively responsive to a pressure distribution developed in the vessel by flow of a slurry of ice and concentrated liquid thereto and the weight of ice floating on concentrated liquid in the vessel, to control concentrated liquid flow through the third conduit to maintain a predetermined pressure distribution in the vessel.

* * * * *